US006516561B1

(12) United States Patent
Mancini

(10) Patent No.: US 6,516,561 B1
(45) Date of Patent: Feb. 11, 2003

(54) UNITARY TREE AND SHRUB STABILIZING DEVICE

(76) Inventor: James A. Mancini, 38 Upper Kingtown Rd., Pittstown, NJ (US) 08867

(*) Notice: Subject to any disclaimer, the term of this patent is extended or adjusted under 35 U.S.C. 154(b) by 0 days.

(21) Appl. No.: 10/113,729

(22) Filed: Apr. 1, 2002

(51) Int. Cl.[7] .............................................. A01C 11/00
(52) U.S. Cl. .......................................... 47/42; 47/48.5
(58) Field of Search ......................... 47/42, 43, 41.14, 47/48.5, 47; 173/32, 90; 175/170; 227/20, 23, 28, 53, 150, 110

(56) References Cited

U.S. PATENT DOCUMENTS

| 350,281 | A | | 10/1886 | Wrightsman | |
|---|---|---|---|---|---|
| 535,887 | A | | 3/1895 | Brown | |
| 606,558 | A | | 6/1898 | Ketchum | |
| 1,377,832 | A | | 5/1921 | Hanner | |
| 1,560,404 | A | | 11/1925 | Brown | |
| 2,926,874 | A | | 3/1960 | Hahn | 248/44 |
| 4,026,094 | A | | 5/1977 | Sasur | 56/400.04 |
| 4,658,737 | A | | 4/1987 | Weissberg | 111/2 |
| 4,894,950 | A | | 1/1990 | Yukio et al. | 47/42 |
| 5,473,839 | A | * | 12/1995 | Stidham | 248/156 |
| 5,568,700 | A | | 10/1996 | Veneziano et al. | 47/43 |
| 5,605,010 | A | * | 2/1997 | Furlong et al. | 47/47 |
| 5,694,716 | A | * | 12/1997 | Bible | 175/23 |
| 5,970,655 | A | * | 10/1999 | Freeman | 47/40.5 |
| 5,996,279 | A | * | 12/1999 | Zayeratabat | 47/48.5 |
| 6,065,243 | A | * | 5/2000 | Mancini et al. | 248/351 |
| 6,141,903 | A | | 11/2000 | Mancini | 47/42 |
| 6,299,125 | B1 | * | 10/2001 | Zayeratabat | 248/218.4 |

FOREIGN PATENT DOCUMENTS

| DE | 3534077 A1 | * | 4/1987 | A01G/23/04 |
|---|---|---|---|---|
| DE | 4008-580 A1 | | 3/1990 | |

OTHER PUBLICATIONS

Nine (9) pages providing tree staking information from website http://www.lee–county.com/publicworks/landpage50.htm.

* cited by examiner

Primary Examiner—Michael J. Carone
Assistant Examiner—Susan C. Alimenti
(74) Attorney, Agent, or Firm—Kenneth Watov; Watov & Kiphes, P.C.

(57) ABSTRACT

A unitary device for securing the root ball of newly planted trees and/or shrubs into proper position, for stabilizing the trees and/or shrubs to prevent shifting or toppling while the tree and/or shrub root systems are first developing. The device includes a horizontal cross member, and a couple of prongs perpendicularly depending from the horizontal cross member, all formed from a single piece of rod or tubing material. At the time of planting, after the root ball of the tree is set into an appropriate hole and the tree is in proper position, the free ends of the prongs of the device are driven into the ground such that the outer prong is retained in the firm portion of the soil, and the inner prong engages the root ball. The outer prong is of a sufficient length to be held securely in the soil, and the inner prong is both arranged in position and sized in length to engage the root ball securely. The device is driven into the soil deep enough for the cross member to be recessed into the root ball to provide a firm engagement therebetween and to ensure that the device is established below the finished grade of the ground.

2 Claims, 8 Drawing Sheets

UNITARY TREE AND SHRUB STABILIZING DEVICE

RELATED PATENTS

This Application is related to U.S. Pat. No. 6,141,903, entitled TREE STAPLE, issued on Nov. 7, 2000, and to U.S. Pat. No. 6,065,243, entitled TREE AND SHRUB STABILIZING DEVICE, issued on May 23, 2000. Each related patent has common ownership herewith.

FIELD OF THE INVENTION

The present invention relates generally to an apparatus for stabilizing newly planted trees and shrubs to prevent them from shifting or toppling while their root systems are first developing, and more particularly to devices and methods for securing the root balls of the newly planted trees or shrubs into proper position.

BACKGROUND OF THE INVENTION

In the initial period, newly planted trees or shrubs typically require some level of assisted support to avert tilting or toppling. Strong winds and excessive moisture can cause a poorly supported tree or shrub to lean excessively or fall to the ground. Adequate support not only enhances the survival of the tree or shrub during the critical growth period, but also reduces the risks of injury to people and of damage to property. The support is usually maintained until the roots have sufficiently established themselves in the ground. The time required for the roots to establish themselves can vary depending on tree or shrub type, growth conditions, soil type and condition, moisture and nutrient level and other factors. Adequate support is necessary for larger trees or shrubs especially those planted during wet or freezing weather.

Conventional methods for supporting trees or shrubs typically include driving two or more stakes into the ground adjacent to the trunk or the tree or shrub and tethering the trunk to the stakes with guy wires to provide the support. The stakes are usually composed of wood or other suitable material in the form of short spikes a few inches in length to elongate poles a few feet in length. The stakes can deteriorate rapidly and are typically limited to single use. Such conventional methods are generally limited to stabilizing small to moderate sized trees and shrubs, and are not recommended for supporting substantially larger trees and shrubs.

There are several disadvantages associated with using stakes and guy wire systems. The stakes and guy wires are typically exposed above grade level of the ground, and can pose hazards to passing traffic such as pedestrians, children, ground maintenance equipment such as lawnmowers and the like. The presence of such components are usually displeasing to the eye and often undesirably detract from the appearance of the tree or shrub and the surrounding area. The stakes and guy wires also need frequent attention and adjustment, since they can become loosened, vandalized, damaged, shifted or simply outgrown by the tree or shrub. Once the roots of the tree or shrub have become established, the stakes and guy wires require prompt disassembly and removal to prevent potentially fatal disfigurement or injury to the tree or shrub.

For the foregoing reasons, there is a need for developing an improved device and method for providing a tree or shrub with adequate support at the time of planting that avoids the limitations associated with conventional devices and methods as highlighted above.

SUMMARY OF THE INVENTION

It is an object of this invention to provide a unitary multi-pronged device, fabricated from a single piece of material, of sufficient size to engage both the root ball and the surrounding undisturbed earth, that can provide stabilizing support for any size tree or shrub.

Another object of the invention is to provide a tree and/or shrub stabilizing support without potentially hazardous cables, ropes, or wires, or stakes.

Another object of the invention is to provide a tree and/or shrub stabilizing support apparatus that is not difficult to mow or to trim around.

Another object of the invention is to provide a tree and/or shrub stabilizing support apparatus that is not unsightly.

Yet another object of the invention is to provide a stabilizing support apparatus that after a period of time in which the planting becomes self-supporting, the components of the apparatus can remain in the ground.

Another object of the invention is to provide a stabilizing support apparatus that can be made permanent, or can be removed and used again.

Another object of the invention is to provide a tree and/or shrub stabilizing support apparatus including a device that is applicable to small trees and shrubs, and equally applicable to larger plantings.

Another object of the invention is to provide a tree and/or shrub stabilizing support apparatus that provides superior physical stabilization in comparison to conventional systems.

Another object is to provide a tree and/or shrub stabilizing support apparatus comprising a unitary multi-grouped tubular device and tool for driving the device into the ground without damage.

A further object of the invention is to provide a tree and/or shrub stabilizing support apparatus that is quicker and easier to install than the conventional methods.

Another object of the invention is to provide an improved tree and/or shrub stabilizing support apparatus including a device that facilitates the application of water and/or fertilizer to the root system of the tree or shrub.

In one embodiment of the invention, with the problems of the prior art in mind, various objects of the invention are provided by a novel unitary tree stabilizing device, fabricated from a single piece of material, having a cross member, and two side portions of prongs perpendicularly depending or bent from proximate the ends of the horizontal cross member. The embodiment typically has a vertical outer prong bent from proximate one end of the horizontal cross member, and a vertical inner prong bent from the other end of the cross member. The free ends of the outer and inner prongs include tapered ground penetrating tips that can be formed, for example, by cutting the free ends at an angle relative to the horizontal.

In a second embodiment, the angles and orientation of the ground penetrating tips at the respective free ends of the prongs are selected to substantially prevent the prongs from breaking up the root ball as the present device is driven into the ground.

In all of the embodiments described, the unitary tree stabilization devices may consist of material such as iron, steel, or other metal, preferably free of harmful platings or coatings. Typically, an inexpensive material such as metal or plastic polymer in the form of a reinforcement bar (rebar) or a tubular member can be used. Other suitable materials can also be used for fabricating the device of the present invention. Optionally, the device can include a through cavity or hollow core extending from an inlet in the cross member to a plurality of holes in the prongs through which a substance such as water or fertilizer can be conveniently irrigated directly to the roots of the tree or shrub beneath the ground.

In all of the embodiments described, the unitary tree stabilizing device is preferably installed at the time the tree or shrub is planted. After the root ball of the tree or shrub is set into an appropriate sized hole, the tree is positioned to the proper vertical position and desired orientation, and the surrounding hole space is filled with soil, the tree stabilizing device is driven into the ground such that the outer prong engages the soil around the root ball, and the inner prong engages the root ball. The outer prong is of a sufficient length to be held permanently and securely into the earth, and the shorter inner prong is arranged both in position and length to engage the root ball securely. The unitary tree stabilization device is typically driven into the earth deep enough so that the cross member will be recessed into the root ball and adjacent soil to ensure a secure anchoring engagement of the device with the root ball. By recessing the cross member into the root ball, the tree stabilization device is positioned below the finished grade of the ground. Since the tree stabilization device is established below the finished grade, the disadvantages of the prior art including hazards to passing traffic, unappealing appearance and the like, are avoided.

BRIEF DESCRIPTION OF THE DRAWINGS

The various embodiments of the invention are described in detail below with reference to the drawings, in which like items are identified by the same reference designation, wherein.

DETAILED DESCRIPTION OF THE INVENTION

The present invention is generally directed to an apparatus for stabilizing a tree or shrub which comprises a unitary stabilization device adapted for providing structural support to trees and/or shrubs, and optionally a tool for installing the stabilization device. The stabilization device of the present invention provide safe and effective support for a range of plantings in all types of soils and conditions, while being relatively inexpensive and simple to fabricate and install. The stabilization device is further adapted for effective concealment during use to avoid obstructing passing traffic including pedestrians, and avoid detracting from the appearance of the tree or shrub and the surrounding area. The stabilization device is also designed to prevent or at least minimize any injury to the tree and/or shrub during planting.

Figure 1:
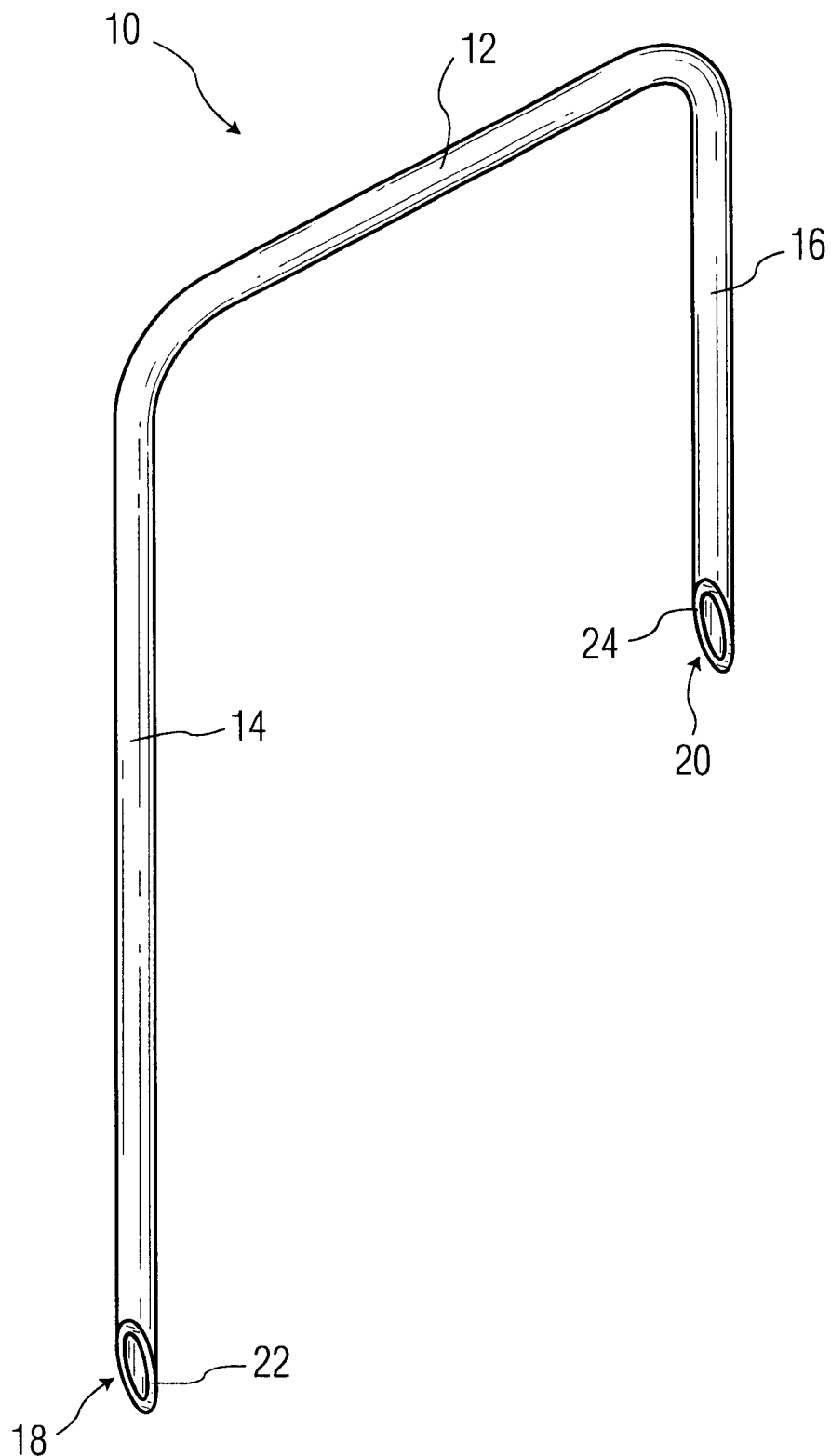
FIG. 1 is a pictorial view of one embodiment of the invention in which a tree stabilization device is provided from a single piece of material, making it unitary, having an outer prong and a shorter inner prong, each bent vertically from a cross member.

FIG. 1 shows a preferred embodiment of a tree stabilization device 10 in accordance with the principles of the present invention. The tree stabilization device 10 includes in this embodiment a single piece of tubing material bent into a substantially squared-off U-shaped configuration having a horizontal cross member 12. A vertically oriented outer prong 14 is bent from one end of the cross member 12, and a vertically oriented inner prong 16 is bent from the other end of the cross member 12. The inner prong 16 is shorter than the outer prong 14, in this example. It is noted that the lengths of the outer and inner prongs 14 and 16 can vary with respect to one another depending on the needs of the application at hand, the depth of the planting hole, soil conditions, terrain features, and the like.

The outer and inner prongs 14 and 16 each include ground penetrating tips 22 and 24, respectively, at respective ends 18 and 20. The ground penetrating tips 22 and 24 are each cut at substantially parallel angles with respect to one another. The ground penetrating tip 24 is formed by making a cut proceeding from the inside surface of the prong 16 downward to its outside surface at the end 20 at an angle sufficient to form a sharp point. The ground penetrating tip 22 is formed by making a cut proceeding from the outside surface of the prong 14 downward to its inside surface at the end 18 at a substantially equivalent angle for forming the tip 24 of the prong 16. The cuts form point edges that are angled in a manner to cause the prongs 14 and 16 to slightly shift towards the tree as the device 10 is being driven into the ground. The tendency for the prongs 14 and 16 to shift towards the tree helps to prevent or at least minimize the break-up of or injury to the root ball. Optionally, the ends of the prongs 14 and 16 can be further modified through suitable methods such as by pinching or welding to seal the tips 22 and 24, respectively. It is further noted that the form of the ground penetrating tips and the method of fabricating them are not limited to those disclosed herein, and can include other suitable configurations and methods as known in the art.

The tree stabilization device 10 of the present invention can be fabricated with a solid or tubular construction using a durable, rigid material that is impact resistant including wood, plastic polymers, metal such as ferrous-based alloys or other suitable material that is at least minimally safe for plants including trees and shrubs, and free from harmful plating or coatings.

In another embodiment of the present invention, the tree stabilization device can be fabricated from a plastic polymer material preferably one that is biodegradable. The plastic polymer can be extruded, molded or reinforced, and is capable of withstanding the rigors associated with installation and implementation. The plastic polymer material can be further impregnated with a soil enriching or conditioning agent that can be released into the surrounding soil and provide beneficial sustenance for the growth of plants including trees and shrubs. Such soil enriching agent can include minerals, ions, fertilizers including nitrogen sources, and other suitable plant nutrients.

The tree stabilization device 10 can be driven into the ground using conventional mallets, sledge hammers or other appropriate means for driving the device 10 into the ground. During installation, the shorter inner prong 16 is positioned for penetration into the root ball of the planting, and the outer prong 14 is positioned for penetration into the more stable ground extending around the perimeter of the root ball. Once the device 10 is so positioned, a mallet or hammer can be used to strike the upper portions of the cross member 12, preferably near the prong 14 or 16, to drive the device 10 into the ground.

Figure 2:
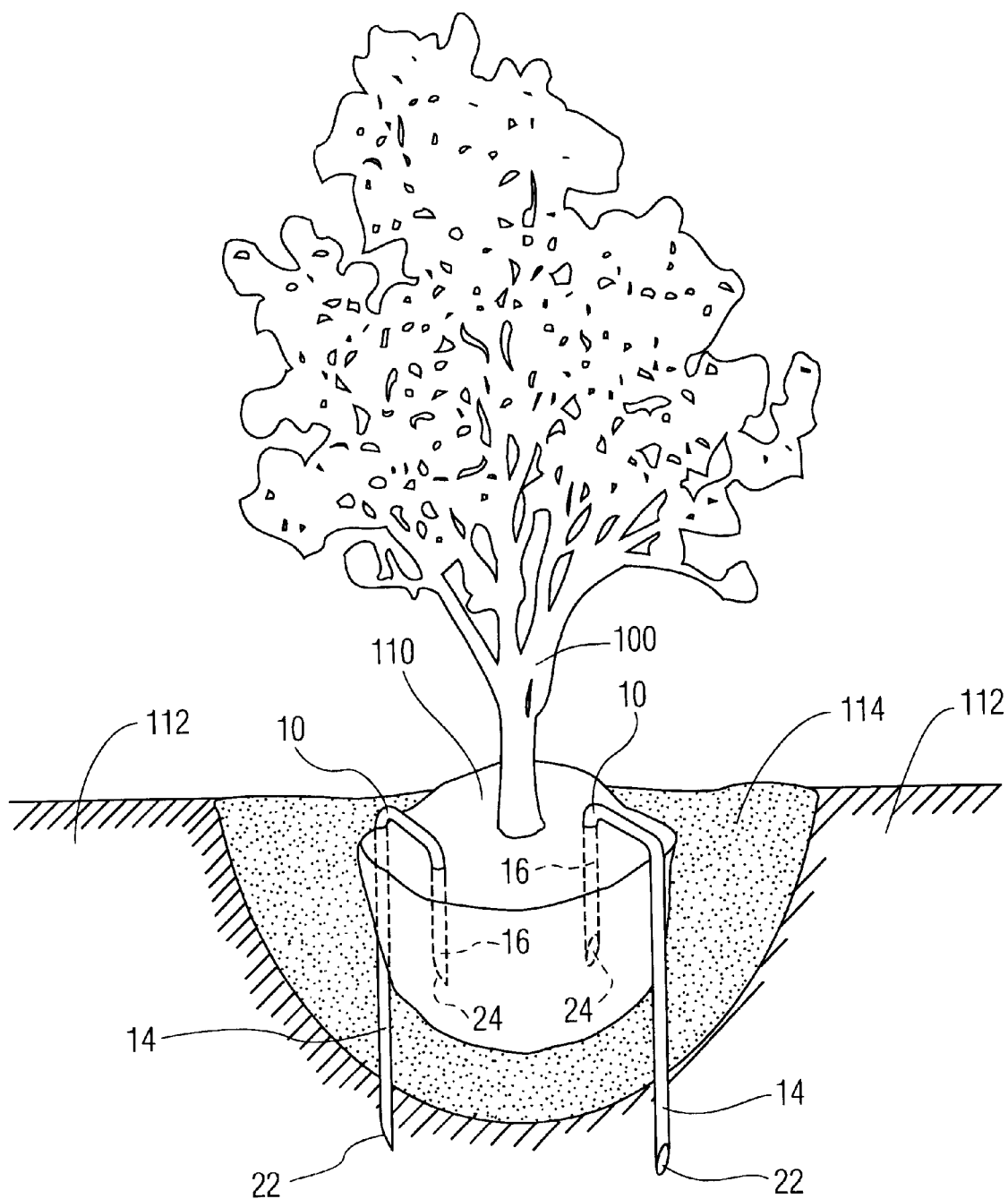
FIG. 2 illustrates a newly planted tree stabilized by a pair of the present unitary tree stabilization devices in one embodiment of the present invention.

In FIG. 2, two unitary tree stabilization devices 10 are installed for stabilizing a newly planted tree 100 having a root ball 110. Generally, a planting hole having a diameter twice that of the root ball 110 is prepared. The root ball 110 is placed into the planting hole with the base of the tree trunk even with or above the grade level of the surrounding soil 112. As the root ball 110 is placed into planting hole, a quantity of fill soil 114 is added to fill the space under the root ball 110 and elevate the tree 100 to a suitable planting height. The devices 10 are positioned at opposite sides of the tree 100 to provide a dimensionally-equalized anchoring support. The inner prongs 14 are placed over the root ball 110, while the outer prongs 14 are placed on the soil along the edge of the root ball 110. With the tree 110 held in the desired positioned, each of the devices 10 is driven fully into the ground until the cross member 12 is recessed into the root ball 110. Recessing the cross member 12 into the root ball 110 ensures that the device 10 is firmly secured to the root ball 110 and that the device 10 is installed below the finished grade of the ground for effective concealment. Preferably, the cross member 12 is recessed about an inch or more into the root ball 110. It is noted that the number, shape, and size of the stabilization devices can be modified as required depending on the size and type of tree, the planting hole and root ball, the features of the terrain, the soil conditions, the soil type, the moisture content of the soil, the wind conditions, space constraints and the like.

The inner prongs 16 of the devices 10 are adapted to efficiently penetrate into the root ball 110 of the tree 100. The respective pointed inner prong tips 24 include sharp points that can penetrate the root ball 110 to provide a secure anchoring engagement. The outer prongs 14 each comprise a length sufficient to extend through the fill dirt 114 beyond the depth of the planting hole into the surrounding undisturbed soil 112 for deep anchoring engagement. In order for the outer prongs 14 to penetrate the undisturbed soil 112, the outer prongs 14 are preferably longer than the depth of the planting hole.

In the preferred embodiment, the devices 10 are each positioned with the outer prongs 14 positioned adjacent to the root ball 110 and the inner prongs 14 positioned at a distance halfway between the edge of the root ball 110 and the tree 100. The inner prongs 16 and the respective cross members 12 are each offset at an angle from the extended radius of the tree 100. The respective cross members 12 are each oriented substantially parallel with one another. Preferably, the angle can range from about 0° to 90°, preferably from about 30° to 45°.

Figure 3A:
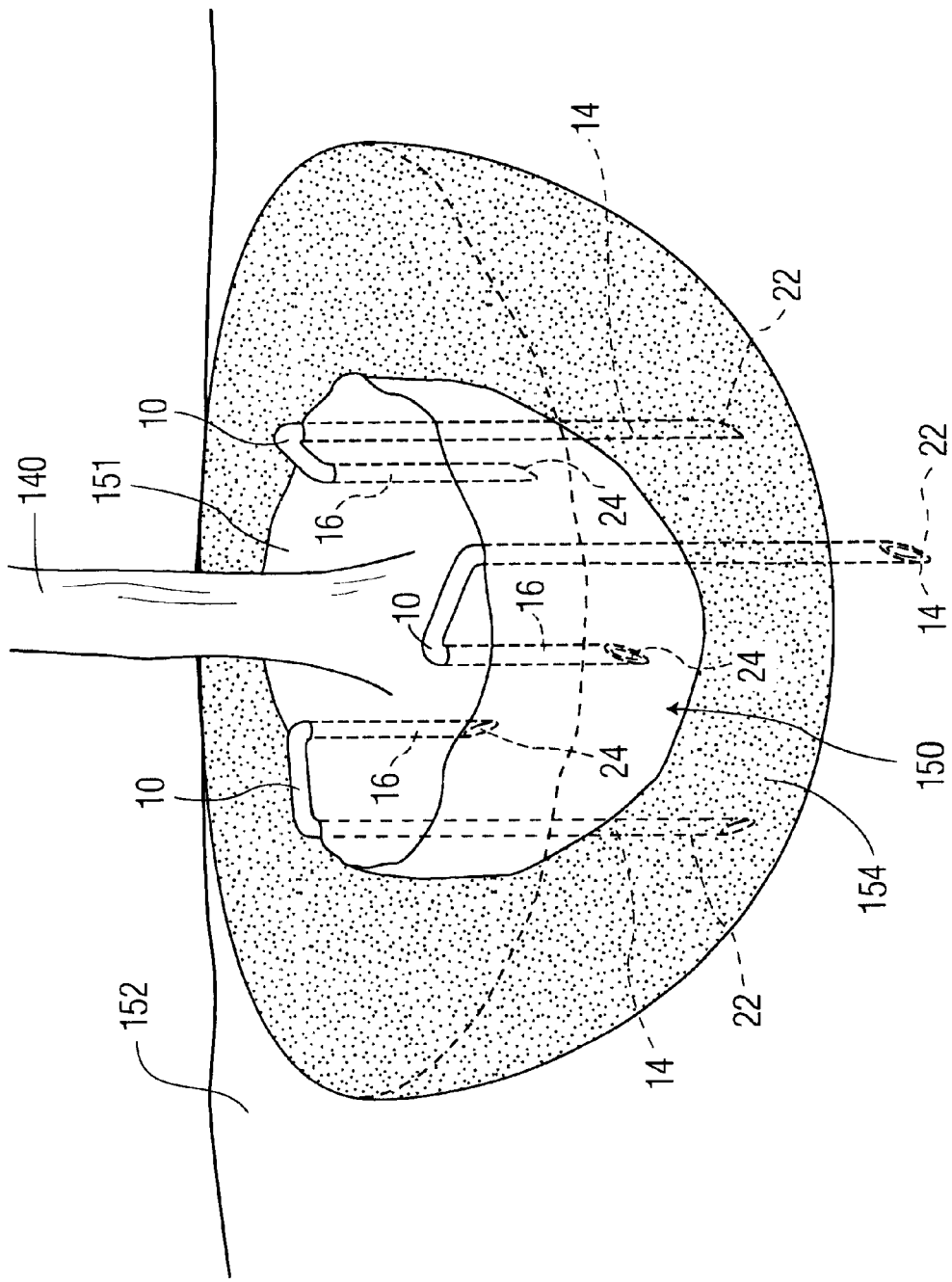
FIG. 3A illustrates a newly planted tree stabilized by three unitary tree stabilization devices arranged in one of many possible support configurations in accordance with the principles of the present invention.

With reference to FIG. 3A, a plurality of unitary tree stabilization devices 10 are shown employed in a spatial configuration or arrangement to securely anchor a tree or shrub 140 having a root ball 150 planted in the ground. The root ball 150 includes a top portion 151. The plurality of devices 10 are arranged radially around the tree or shrub 140 and spaced apart by about 120° from one another to provide a firm dimensionally-equalized support in all directions. The root ball 150 is separated from the undisturbed soil 152 by the fill dirt 154. The inner prongs 16 of the devices 10 are securely anchored into the root ball 150, while the outer prongs 14 extending through the fill dirt 154 are embedded in the undisturbed soil 152. Each of the devices 10 is driven into the ground until the cross member 12 is recessed into the top portion 151 of the root ball 150 to provide a firm engagement therebetween and to ensure that the device 10 is positioned below the finished grade of the ground. Preferably, the cross member 12 is recessed about an inch or more into the root ball 150.

Figure 3B:
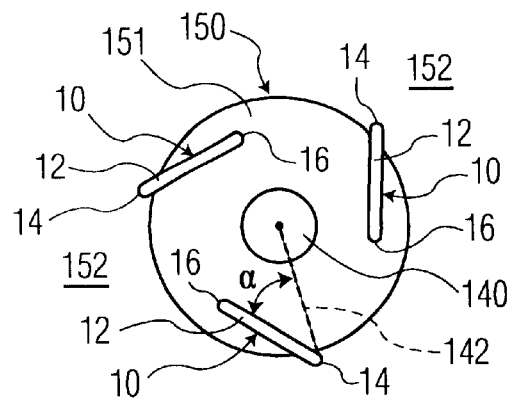
FIG. 3B is a top view of the newly planted tree stabilized by the three unitary tree stabilization devices as shown in FIG. 3A.

With reference to FIG. 3B, the devices 10 are each positioned with the outer prongs 14 positioned adjacent to the root ball 150 and the inner prongs 14 positioned at a distance halfway between the edge of the root ball 150 and the tree 140. The inner prong 14 and respective cross member 12 of each device 10 are oriented at an angle, α, measured from the extended radius 142 of the tree 140. The angle, α, can range from about 0° to 90°, preferably from about 30° to 45°.

Figure 4:
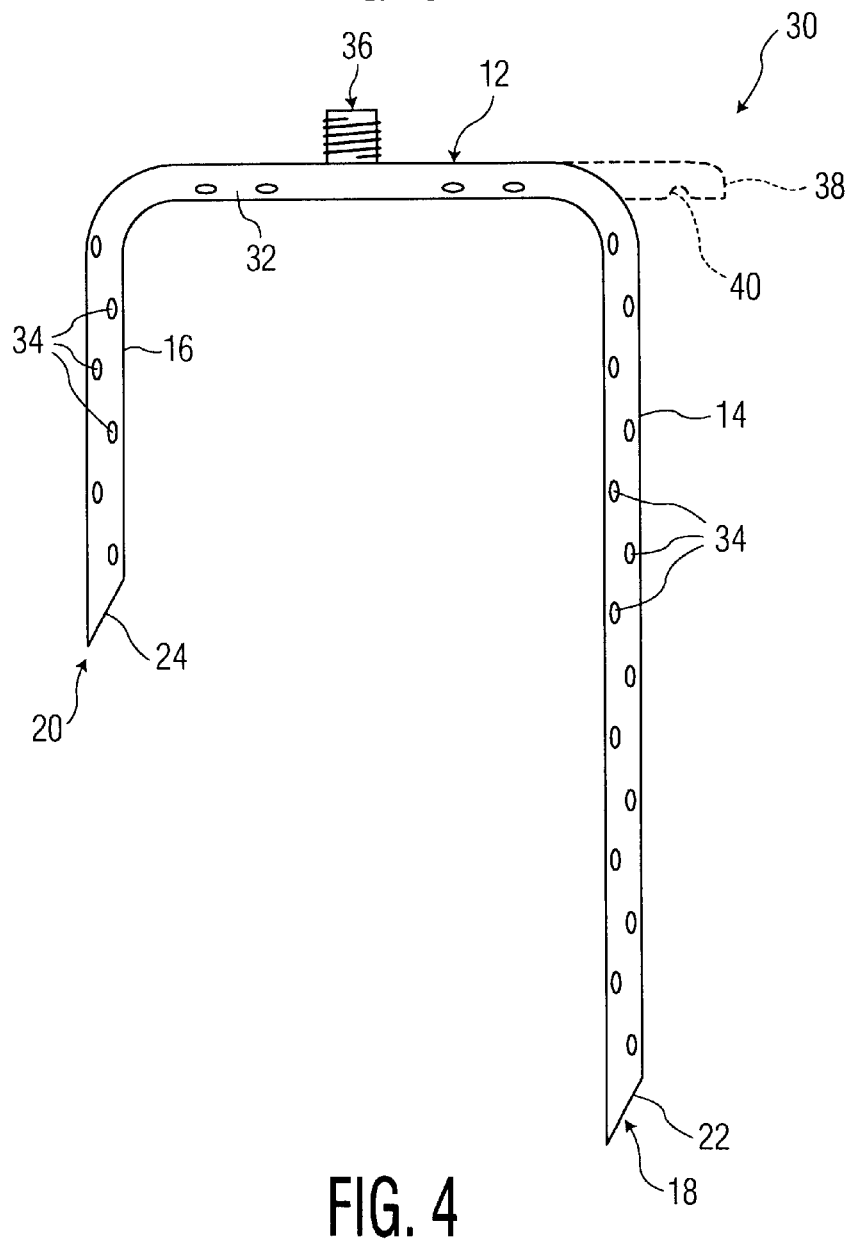
FIG. 4 is a side elevational view of a unitary tree stabilization device in accordance with second embodiment of the present invention.

Referring to FIG. 4, a tree stabilization device 30 is shown for a second embodiment of the present invention. The device 30 consists in this example of a single piece of tubing material, and includes a cross member 12, an inner prong 16 formed by bending one end portion of the tubing from one end of the cross member 12 at substantially a right angle, and an outer prong 14 formed by bending the other end portion of the tubing from the other end of the cross member 12 at substantially a right angle. The inner prong 16 includes a ground penetrating tip 24 at its end 20 and the outer prong 14 includes a ground penetrating tip 22 at its end 18, each formed in the same manner as described above for the device 10. As previously indicated, the device 30 includes a tubular wall 32 typically constructed from a rigid, impact resistant material such as metal or other suitable material for defining an interior cavity or hollow pathway therein.

The device 30 further includes an opening 36 in the tubular wall 32 at the upper portion of the cross member 12, and a plurality of irrigation through holes 34 in the tubular wall 32 of the cross member 12, and the outer and inner prongs 14 and 16, respectively, in communication with the hollow pathway, thus permitting fluid passage from the opening 36 to the through holes 34. Once the device 30 is set in the ground, the user can introduce a liquid such as water or a fertilizer solution into the hollow pathway of the tubing 32 via the opening 36, wherein the fertilizer or water is able to exit from the irrigation holes 34 into the surrounding soil.

Optionally, the opening 36 can further be adapted to receive the threaded end of a hose to provide a secure fluid coupling therebetween during irrigation. In this manner, the newly established roots of the planting can be fertilized and/or watered directly without undesirably disturbing the soil surface and the fill soil. The device 30 can further include a soil enriching or conditioning agent such as in the form of water-soluble fertilizer granules captively retained in the hollow pathway. The user adds water through the opening 36 into the device 30 where the retained fertilizer is dissolved and carried into the surrounding soil.

Optionally, the device 30 can further include a projection 38 (shown in phantom in FIG. 4) securely attached to the cross member 12 proximate the outer prong 14. The projection 38 can be attached to the cross member 12 through any suitable means including welding and the like. The projection 38 includes a notch portion 40 located proximately to the distal end thereof A guy wire can be used to encircle the trunk or body of the planting and then tied to the notched portion 40 of the projection 38 to provide additional anchoring support, if required.

Figure 5:
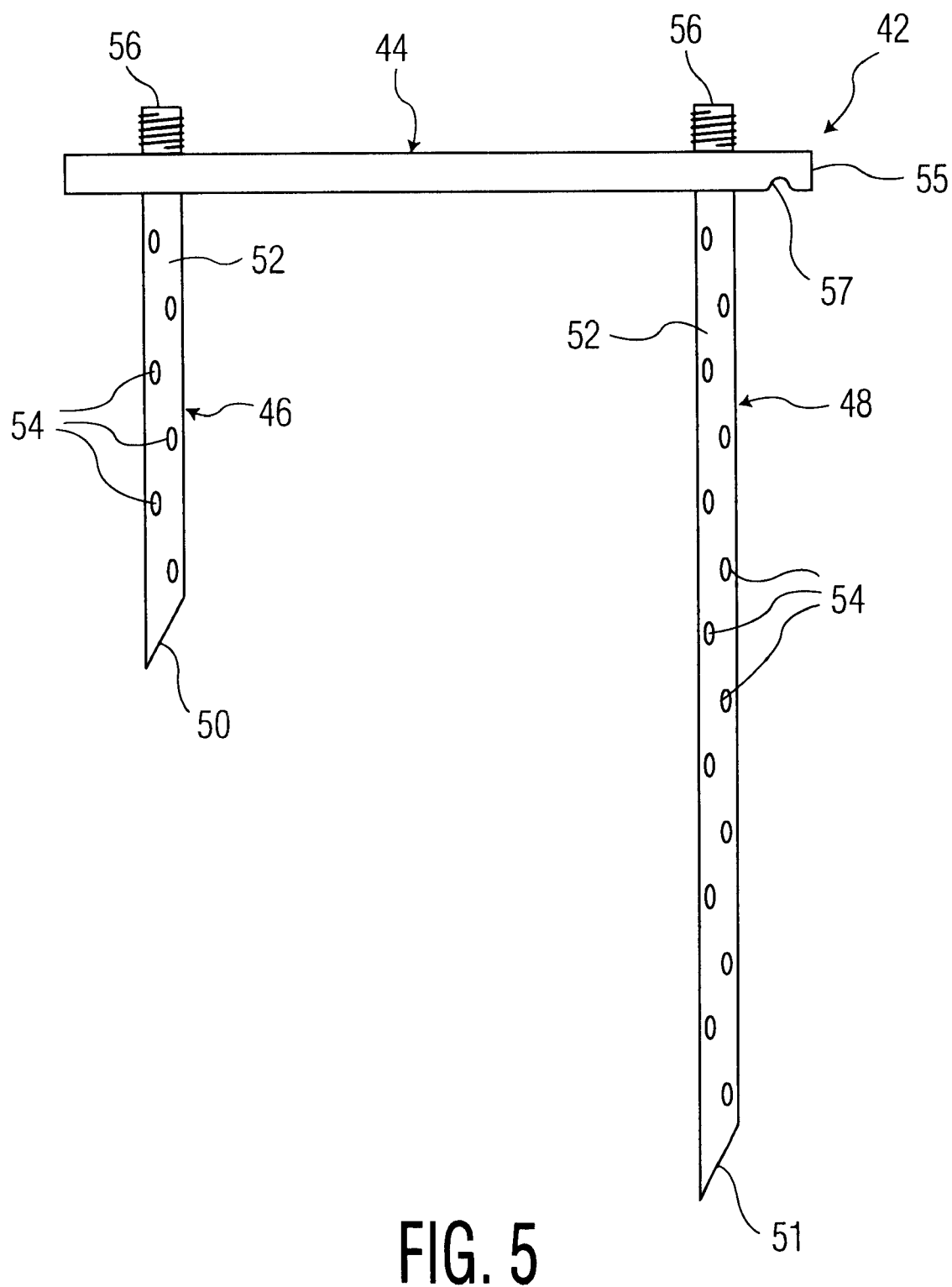
FIG. 5 is a side elevational view of a unitary tree stabilization device in accordance with a third embodiment of the present invention.

With reference to FIG. 5, a tree stabilization device 42 is shown for a third embodiment of the present invention. The device 42 includes a cross member 44, an inner prong 46 attached near one end of the cross member 44, and an outer prong 48 attached near the other end of the cross member 44. The prongs 46 and 48 can be attached to the cross member 44 through any suitable means including welding and the like. The inner and outer prongs 46 and 48 include ground penetrating pointed tips 50 and 51, respectively, a tubular wall 52 defining a through cavity or open pathway in each prong 46, 48, and a plurality of irrigation through holes 54 in the tubular walls 52 in communication with the pathway. The device 42 further includes a pair of irrigation openings 56 each located proximate to the upper end of the cross member 44 in communication with the respective pathways of the inner and outer prongs 46 and 48. Once the device 42 is installed, fluid such as water or fertilizer can be introduced through the corresponding openings 56 and passed through the respective pathways where it exits the irrigation holes 54, respectively, to irrigate the surrounding soil. The irrigation openings 56 can further be adapted to receive the threaded end of an irrigation hose for secure fluid coupling therebetween.

The device 42 can further includes a projection 55 with a notch 57 attached at the end of the cross member 44 proximate the outer prong 48. Once the device 42 is established in the ground, a guy wire can be tied to the projection 55 at the notch 57 with the other end secured to the trunk of the tree, thereby providing additional support as needed.

Figure 6A:
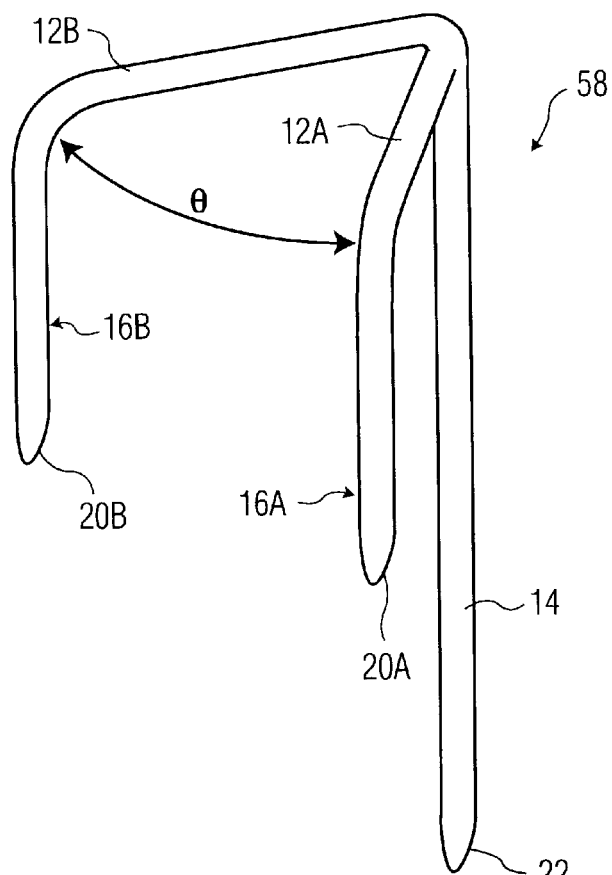
FIG. 6A is a perspective view of a unitary tree stabilization device in accordance with a fourth embodiment of the present invention.
Figure 6B:
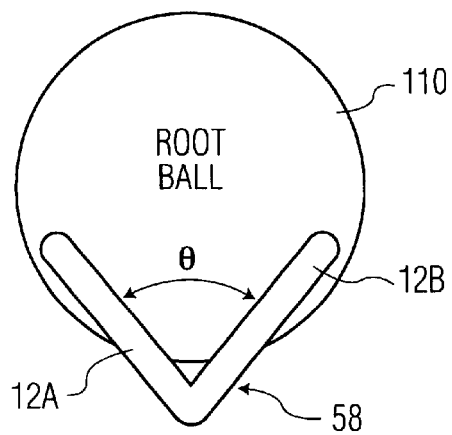
FIG. 6B is a top plan view of the unitary tree stabilization device of FIG. 6A operatively engaged with a root ball of a tree or shrub.

With reference to FIGS. 6A and 6B, a tree stabilization device 58 is shown for a fourth embodiment of the present invention. The tree stabilization device 58 can be constructed from tubular material, flat stock, rebar and the like. It is noted that although the tree stabilization device 58 is illustrated as a unitary piece, it can be comprised of individual components assembled by suitable means including welding and the like. The tree stabilization device 58 includes an outer prong 14 with a ground penetrating tip 22, and a pair of cross members 12A and 12B each connected at a common end to the top of the outer prong 14.

As shown in FIG. 6A, the cross members 12A and 12B are separated from one another by an angle, θ. The cross members 12A and 12B each include an inner prong 16A and 16B, respectively, with ground penetrating tips 20A and 20B, respectively. The prongs 14, 16A and 16B in one embodiment can be welded together or can be made from a single casting, for example.

As shown in FIG. 6B, the cross members 12A and 12B are adapted to position the respective inner prongs 16A and 16B for penetration into a root ball 110 of a tree. The inner prongs 16A and 16B are positioned apart to spread the hold over a wider area, thus improving the anchoring to the root ball 110. The angle, θ, between the inner prongs 16A and 16B can vary depending on the dimensions of the root ball, soil conditions and the like. Preferably, the angle, θ, can range from about 10° to 80°. It is understood that the number of inner prongs is not limited to two, and can include more than two.

Figure 7:
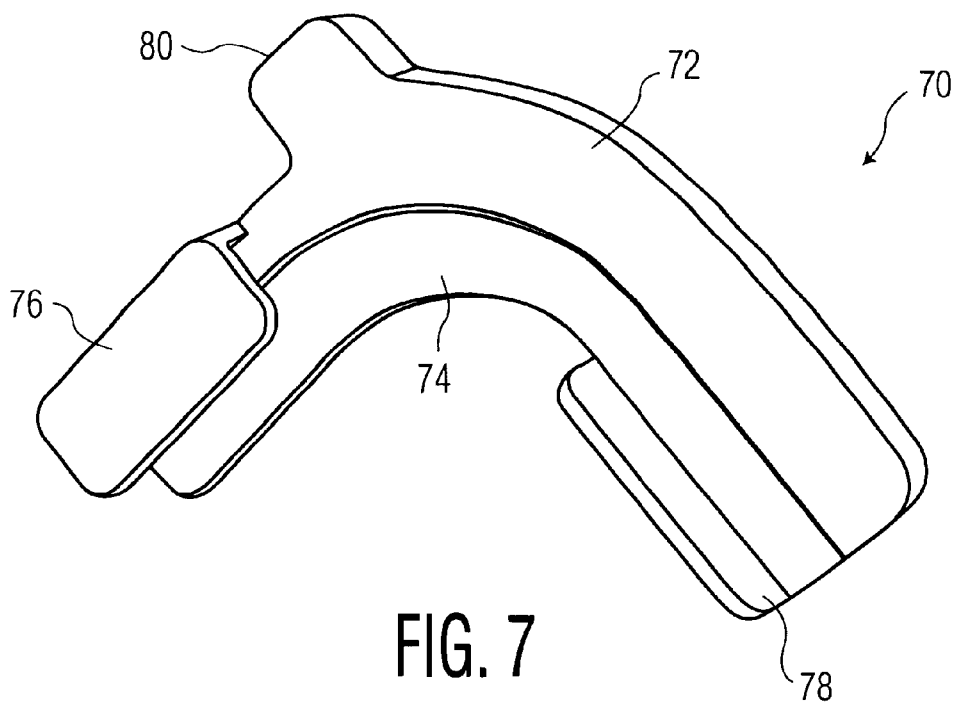
FIG. 7 is a front perspective view of a tool for driving the inner and outer prongs into the ground without damaging the portions of the associated cross members that is impacted or struck in accordance with the present invention.
Figure 8:
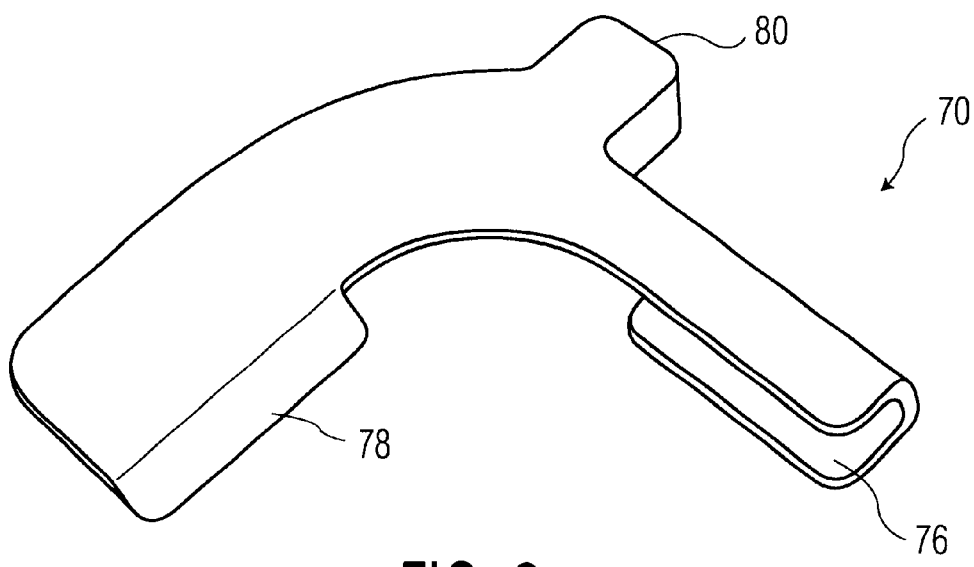
FIG. 8 is a rear perspective view of the tool of FIG. 7.

With reference to FIGS. 7 and 8, an optional impact tool 70 for installing the tree stabilization device of the present invention is shown for one embodiment of the present invention. The tool 70 is adapted for flush mating engagement with the tree stabilization device 10 of FIG. 1 as further described below. The tool 70 includes a body portion 72, a curved grooved portion 74, an upper retainment portion 76 proximate one end thereof, a lower retainment portion 78 proximate the other end thereof, and a striking protrusion 80. The upper retainment portion 76 includes a vertical width which is preferably less than the diameter of the device 10 to facilitate mounting and removal from the device 10. The tool 70 is adapted to be struck by the user and to effectively focus and direct the generated impact force through the prongs of the tree stabilization device of the present invention, while minimizing any damage to the device. The tool 70 is constructed as a solid piece from an impact resistant, high-strength material such as steel, for example. Applicants note that the tool can be modified to operate with different embodiments of the tree stabilization device in accordance with the present invention as understood by one skilled in the art.

Figure 9:
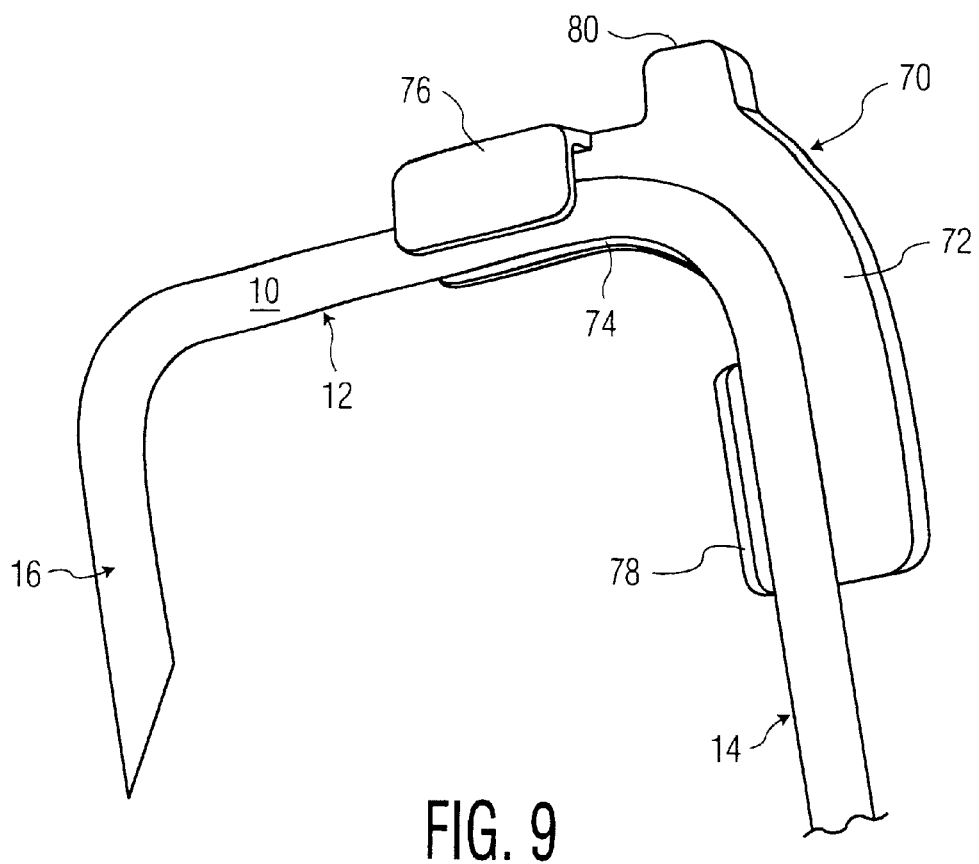
FIG. 9 is a perspective view of the tool operatively coupled to one embodiment of the unitary tree stabilization device in accordance with the present invention.

In FIG. 9, the tool 70 is shown operatively coupled to the tree stabilization device 10. The curved groove portion 74 in combination with the retainment portions 76 and 78, respectively, are adapted to fit with the contours of the stabilization device 10 preferably along the portion between the cross member 12 and the outer prong 14. The tool 70 is adapted to be attached to the stabilization device 10 so that the impact area or the striking protrusion 80 is positioned in axial alignment with the outer prong 14. In this manner, the user can strike the striking protrusion 80 with a mallet to efficiently drive the stabilization device 10 into the ground. As noted above, the tool 70 is designed to direct and to focus the impact force into the outer prong 14, while preventing or at least minimizing any damage to the physical integrity and exterior portion of the device 10. Applicant notes that the striking protrusion 80 can be omitted from the tool 70, and the user can strike along the top surface of the tool 70 to drive the device 10 into the ground.

Figure 10:
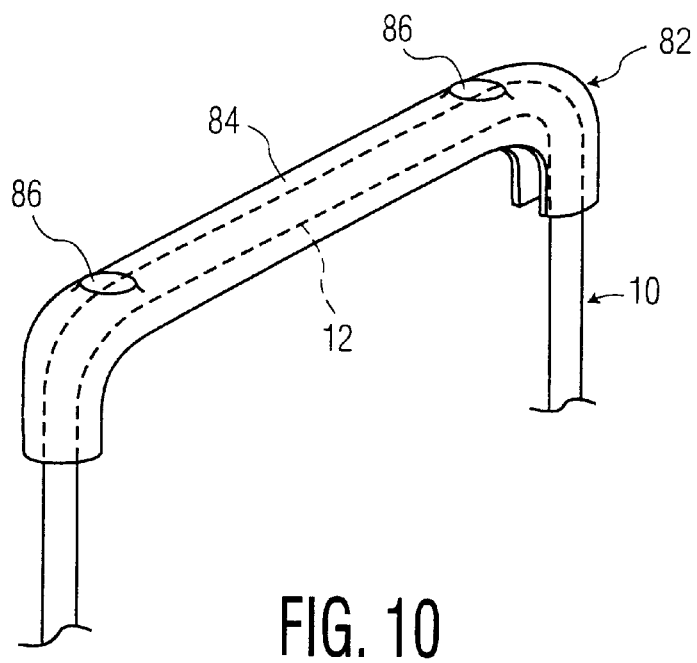
FIG. 10 is a perspective view of a tool for another embodiment of the present invention shown operatively coupled to the unitary tree stabilization device for the embodiments of the present invention of FIGS. 1 and 4.

In FIG. 10, an optional impact tool 82 is shown for a second embodiment of the present invention. The impact tool 82 is similar to the impact tool of FIGS. 7–9. In this embodiment, the impact tool 82 is adapted to fit over the length of the cross member 12. The tool 82 can be slipped over the cross member 12 as shown. The user can strike along a top surface 84 of the tool 82 or at the strike points 86 provided thereon to drive the device 10 into the ground.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A tree and shrub root ball stabilizing device comprising:
    a cross member having a first end, a second end, and a notch being formed proximate at one of said first and seconds ends for attaching a tie down rope or cord thereto;

a first tubular prong having an open first end rigidly attached to a portion of said cross member between the first and second ends of the latter, a first through hole being provided to an interior cavity of said first tubular prong;

a second tubular prong having an open first end rigidly attached to a portion of said cross member proximate the second end of said cross member a second through hole being provided to an interior cavity of said second tubular prong and an outer end of said cross member extending away from at least one of said first and second tubular prongs, whereby said notch is formed in said cross member and spaced away from at least one of said first and second tubular prongs;

said first and second tubular prongs being spaced apart, the length of said first tubular prong being longer than said second tubular prong and sufficient for secure retention in the ground beyond an associated root ball, and the length of said second tubular prong being sufficient for penetration into and retention of the associated root ball;

coupling means being connected to said first and second through holes, respectively, in said first and second tubular prongs, for permitting water or fertilizer to flow into the interior cavities of the first tubular prong and second tubular prong, respectively; and a plurality of through holes being provided in sidewall portions of said first and second tubular prongs, for permitting water or fertilizer to be passed therefrom into the surrounding ground and root ball, with said first and second tubular prongs being driven into the ground and root ball, respectively, with the cross member recessed into the root ball and the ground.

2. The device of claim 1, further including a tool adapted for securely fitting onto said cross member for hammering said first and second tubular prongs into the ground and associated root ball, respectively, while afflicting little or no damage to said cross member.

* * * * *